2,935,379

MANUFACTURE OF FERRIC OXIDE

John Martin, Hamilton Square, N.J., assignor to Columbian Carbon Company, New York, N.Y., a corporation of Delaware No Drawing. Application June 13, 1957
Serial No. 665,584

7 Claims. (Cl. 23—200)

This invention relates to the manufacture of pigmentary alpha ferric oxide, i.e. alpha $Fe_2O_3$, and provides an improved method whereby such pigments may be prepared in aqueous suspension, separated from the suspension and dried to produce, directly, a red iron oxide of pigmentary texture and particle size.

Iron oxides and hydrates are extensively used as pigments in paints, lacquers, inks and the like. They may be produced in various colors, including black, brown, yellow and red and intermediate shades, depending primarily upon particle size, composition and crystal structure.

For instance, magnetite ($FeO.Fe_2O_3$) is black in color, is ferromagnetic and has a spinel crystal structure. Theoretically, it may contain 31–33% ferrous oxide, but commercial magnetites usually contain smaller proportions of FeO, as low as 20%. Where the proportion of FeO drops below 20%, a brownish color is developed, due to the presence of some gamma ferric oxide.

Gamma ferric oxide (gamma $Fe_2O_3$) is distinctly brown in color, is ferromagnetic and has a cubical spinel crystal structure.

Alpha ferric oxide (alpha $Fe_2O_3$) is of the same chemical composition as gamma ferric oxide, but is of a different crystal structure. It is red in color, is non-ferromagnetic and has a rhombohedral crystal structure.

Each of the foregoing oxides is essentially anhydrous, containing not more than 1–2% water. This variety of color and other pigmentary characteristics is further enlarged by the hydrates of these oxides.

For instance, the gamma ferric oxide hydrate (FeOOH), containing 10–12% water, ranges from yellow to orange in color, is non-ferromagnetic and has an orthorhombic crystal structure.

For many years, following the early work of Dr. Fireman, these black, brown and yellow pigments have been extensively produced at will in aqueous suspension, by the so-called wet method, as described for instance in Patents No. 1,392,925 and No. 1,392,926. Experience gained over the years has led to the precise control of the identity and properties of the resultant pigments by careful regulation of operating conditions under which they are produced and raw materials and reagents used.

The red, alpha ferric oxide has usually been produced commercially by calcining the yellow, gamma ferric oxide hydrate prepared by the wet method under controlled conditions, as noted above. However, the high temperatures employed in the calcination step have detrimentally affected the texture, dispersibility and tinting strength of the resultant red pigment.

In an effort to improve the quality of the red alpha ferric oxide pigment, the industry has carried on extensive research aimed at developing a process whereby the red ferric oxide pigment can be produced directly by the wet method, thus avoiding the calcining operation. Various theories have been propounded and various proposals have been made, including the precipitation of the pigment and the aging thereof in the presence of carefully prepared seed crystals or various other metal ions such as zinc, copper and the like. Other controls involving for instance, the periodic shifting of the hydrogen ion concentration from acid to alkaline have been proposed, all of which, so far as I am aware, involve troublesome and costly operational procedures which are economically objectionable.

It is an object of my present invention to provide a simple, commercially feasible, economically attractive method by which red ferric oxide having excellent pigmentary properties, including texture, dispersibility, tinting strength and uniformity of color, may be directly produced in aqueous suspension, and whereby subsequent calcination can be avoided.

This is accomplished in accordance with my present invention by the surprisingly simple procedure of digesting gamma ferric oxide, in suspension in an aqueous solution of a ferrous salt, at a moderate temperature within a range of 70°–100° C., the concentration of the ferrous salt solution being within the range of 0.1 to 0.5 mol per liter. By my process, no addition of seed crystals nor the use of high temperatures or superatmospheric pressure is required.

The rate of conversion of the gamma ferric oxide to alpha ferric oxide, by the process of my present invention, is dependent somewhat upon the temperature to which the suspension is heated and also upon the concentration of the ferrous salt solution. The conversion rate is increased as the temperature is increased toward the upper limit of the stated range. However, heating of the suspension at a rate required to maintain boiling is usually economically unjustifiable by the increase in conversion rate. Temperatures within the range of 75°–95° C. have been found most advantageous. The conversion rate at a given temperature is likewise increased by increasing the ferrous salt concentration within the prescribed range.

The digestion is continued until the conversion is completed, as indicated by the change in color from brown to red and the complete loss of ferro magnetism. This may require from 1–20 hours of digestion, depending upon the concentration of various salt solution and the digestion temperature, as previously noted, and also the nature of the gamma ferric oxide used. Under most favorable conditions, complete conversion may be effected in about 4–6 hours.

The gamma ferric oxide so treated may be the natural gamma oxide or may be synthetically prepared by any of the well-known methods. For instance, it may be prepared by oxidation of natural magnetite or by the oxidation of synthetically produced magnetite prepared, for instance, as described in United States Patents 802,928, 857,044. Or it may be prepared by the dehydration of gamma ferric oxide hydrate. Or it may be prepared in the wet state, for instance, by methods described for producing brown iron oxides in United States Patents 1,392,926, 1,420,985, 1,424,635, or 2,357,096.

The brown oxides produced by the last-mentioned patents are primarily gamma ferric oxides. Those of a reddish color frequently also contain a small amount of alpha ferric oxide, which is unobjectionable. Those of a yellowish color usually contain some gamma ferric oxide hydrate, and those of a dark brown color usually contain a smaller amount of magnetite. However, none of these impurities seriously affect my present process.

I have found that any ferrous oxide contained in the gamma ferric oxide used in my process may, with advantage, be selectively dissolved and converted to ferrous salt, in situ, by the addition of a small amount of free mineral acid, e.g. sulfuric or hydrochloric acid, sufficient to react with the ferrous oxide present, to form the ferrous salt required for the formation of the desired red oxide pigment, in accordance with my process. As an alternative, any ferrous oxide impurities present may be converted to gamma ferric oxide by passing a current of oxygen or air through the suspension.

The ferrous salt apparently acts as a catalyst of the conversion, since it remains unchanged after the reaction is completed. Optimum results are obtained when the ferrous salt solution contains no appreciable quantity of free acid or ferric iron. Such impurities considerably retard the conversion. Most advantageous results are obtained where the pH of the solution is maintained in the range of about 2.5 to 4.5. At this pH range, few, if any, ferric ions remain in the solution. Higher acidity and the presence of ferric iron do not completely inhibit the conversion, but do slow the conversion to a commercially impractical rate.

My invention will be further illustrated by the following specific examples:

Example I 20 grams of gamma ferric oxide, prepared by the oxidation of synthetic magnetite by heating to a temperature below 400° C., was suspended in 100 milliliters of 0.2 molar ferrous sulphate solution, and the suspension digested for four hours at a temperature of 90° C. At the end of this period, the suspended material had completely lost its ferromagnetism and was of a red color. The suspension was then filtered, the solid phase washed and dried at 110° C. and was shown by X-ray diffractions examination to be alpha ferric oxide. The dried material had excellent pigmentary texture, dispersibility and tinting strength.

When prepared by this method, the color of the resultant alpha ferric oxide can be varied from a light red to deep red color, depending upon the particle size of the original gamma ferric oxide treated.

Example II

Twenty grams of gamma ferric oxide, prepared as described in United States Patent 2,560,971, was suspended in 100 milliliters of 0.1 molar solution of ferrous chloride and the suspension digested at 85° C. for 6-8 hours. The sample was then filtered, washed and dried at about 100° C. The product was a bright red, non-ferromagnetic, alpha ferric oxide, shown by X-ray diffraction examination to have a typical rhombohedral crystal structure.

Example III

To eight liters of an aqueous slurry containing 500 grams of brown iron oxide, prepared in accordance with Patent No. 2,357,096, and containing a few percent of ferrous oxide, there was added sufficient ferrous sulphate to bring the molar concentration of the solution to 0.1. The resultant slurry was heated to 90° C. and a strong current of air was passed therethrough, while maintaining the temperature just stated, until the strongly ferromagnetic brown oxide was converted to a clear red non-ferromagnetic alpha ferric oxide. The time required to complete this conversion at the stated temperature and concentration normally ranges from 8-12 hours.

The brown oxides, such as used in the foregoing example are essentially gamma ferric oxide but contain small amounts of ferrous oxide, usually within the range of 2-10%. The purpose of the air blowing was to oxidize the ferrous oxide present to the ferric state.

Example IV

Eight liters of an aqueous slurry containing 500 grams of brown oxide, such as used in the preceding example, is heated to 90° C. and sufficient concentrated sulfuric acid added to react with the ferrous oxide present. Where the brown oxide contains 8%, for instance, of ferrous oxide, 60 milliliters of concentrated sulfuric acid is added, to convert the ferrous oxide to ferrous sulphate, the presence of which is necessary in accordance with my process. Where the ferrous oxide content is relatively small and, therefore, the proportion of ferrous sulphate thus generated is insufficient to effect my conversion, I add additional ferrous sulphate in an amount sufficient to raise the molar concentration to about 0.05. Where the proportion of ferrous oxide present in the brown oxide is relatively large, sufficient ferrous sulphate may be generated, thus avoiding the necessity of adding ferrous sulphate as such.

Where the acid is added, as just described, it is with advantage added slowly, a little at a time over a period of several hours at a rate such as to maintain the pH of the slurry within the range of 2.3 to 3.0.

In the operation of the foregoing example, the temperature of the slurry is maintained at 90° until the brown oxide present has been converted to a clear red non-ferromagnetic pigment. This usually requires from 6-8 hours. The slurry is then filtered, washed and dried at about 110° C.

I claim:

1. The process for producing pigmentary, red alpha ferric oxide which comprises digesting gamma ferric oxide in aqueous suspension containing a ferrous salt of a mineral acid in solution in the aqueous phase in molar concentration within the range of 0.1 to 0.5 mols per liter, at a temperature within the range of 70° to 100° C., until the gamma oxide has been converted to a red non-magnetic alpha ferric oxide.

2. The process of claim 1 in which the suspension is digested at a temperature within a range of 75°–95° C.

3. The process of claim 1 in which a minor proportion of ferrous oxide present in the gamma ferric oxide is preliminarily converted to the ferrous salt by adding to the slurry an equivalent proportion of a mineral acid.

4. The process of claim 1 in which a minor proportion of ferrous oxide present in the gamma ferric oxide is preliminarily oxidized to the ferric state by passing air through the suspension.

5. The process of claim 1 in which the pH of the suspension is maintained within the range of 2.5 to 4.5.

6. The process of claim 1 in which the suspension is substantially free from ferric ions.

7. The process of claim 1 in which no substantial amount of free acid is present in the suspension.

References Cited in the file of this patent

UNITED STATES PATENTS

| | | |
|---|---|---|
| 1,424,635 | Fireman | Aug. 1, 1922 |
| 2,560,970 | Martin | July 17, 1951 |
| 2,633,407 | Marsh | Mar. 31, 1953 |